(12) United States Patent
Hurst, Jr.

(10) Patent No.: US 6,459,811 B1
(45) Date of Patent: Oct. 1, 2002

(54) BURSTY DATA TRANSMISSION OF COMPRESSED VIDEO DATA

(75) Inventor: Robert Norman Hurst, Jr., Hopewell, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/283,509

(22) Filed: Apr. 1, 1999

Related U.S. Application Data

(60) Provisional application No. 60/080,439, filed on Apr. 2, 1998.

(51) Int. Cl.[7] .................................................. G06K 9/36
(52) U.S. Cl. ........................ 382/232; 375/272; 455/427
(58) Field of Search ........................ 382/232; 375/272; 455/427, 428, 429; 370/83; 358/1.15

(56) References Cited

U.S. PATENT DOCUMENTS

| | | | |
|---|---|---|---|
| 4,309,764 A | 1/1982 | Acampora | 370/83 |
| 5,117,427 A | 5/1992 | Miyake et al. | 371/37.4 |
| 5,321,725 A | 6/1994 | Paik et al. | 375/39 |
| 5,566,208 A | 10/1996 | Balakrishnan | 375/240 |
| 5,663,957 A * | 9/1997 | Dent | 370/347 |
| 5,790,939 A * | 8/1998 | Malcolm et al. | 455/13.2 |
| 5,974,092 A * | 10/1999 | Roos et al. | 375/272 |
| 6,233,451 B1 * | 5/2001 | Noerpel et al. | 455/427 |
| 6,249,677 B1 * | 6/2001 | Noerpel et al. | 455/427 |

OTHER PUBLICATIONS

International Search Report dated Jun. 14, 1999.

* cited by examiner

Primary Examiner—Yon J. Couso
(74) Attorney, Agent, or Firm—William J. Burke

(57) ABSTRACT

In a data transmission system, an encoder provides a bitstream having a sequence of frame segments, wherein each frame segment has a bit size which is limited by the encoder to a maximum bit size. A transmission channel is provided which has a channel rate sufficient to transmit a frame segment of maximum bit size within a frame interval. A burst transmitter receives the bitstream from the encoder and transmits each consecutive frame segment, at regular frame intervals, in a burst at the channel rate via the transmission channel, to provide a bursty bitstream over the transmission channel.

18 Claims, 2 Drawing Sheets

BURSTY DATA TRANSMISSION OF COMPRESSED VIDEO DATA

CROSS-REFERENCES TO RELATED APPLICATIONS

This nonprovisional U.S. national application, filed under 35 U.S.C. § 111(a), claims, under 37 C.F.R. § 1.78(a)(3), the benefit of the filing date of provisional U.S. national application No. 60/080,439, filed on Apr. 2, 1998 under 35 U.S.C. § 111(b), the entirety of which is incorporated herein by reference.

GOVERNMENT INTERESTS

The U.S. Government has a paid-up license in this invention and the right in limited circumstances to require the patent owner to license others on reasonable terms as provided for by the terms of contract number 70NANB5H1 174 awarded by the National Institute for Standards and Technology (NIST).

BACKGROUND OF THE INVENTION

1. Field of the Invention

The present invention relates to data transmission, and, more particularly, to transmission of compressed video data.

2. Description of the Related Art

Video data consists of video data signals which represent individual video pictures or frames. Each frame may be a still image, but is usually part of a plurality of successive frames of video signal data that represent a motion video sequence.

In various video processing and broadcasting facilities, such as a TV station or studio, there is a need to transmit video signals from one part of the facility to another, to route video signals from selected video sources to selected video destinations or sinks. Video signals nay also be routed from one studio to another. There may be hundreds of video sources (such as the output of a video camera or satellite feed), and hundreds of video sinks (such as a video processor, monitor, video cassette recorder (VCR), or broadcasting unit) that receive video signals from one or more of the video sources. Such facilities also distribute other data signals such as audio signals.

Such systems often operate at a system frame rate, which is typically approximately 30 frames per second (fps). The NTSC standard, for example, operates at $(30*1000/1001) \approx 29.97$ fps (referred to subsequently herein for simplicity as 30 fps). Each frame is typically composed of an even field interlaced or interleaved with an odd field. Accordingly, NTSC cameras output 60 fields of analog video signals per second, which includes 30 even fields interlaced with 30 odd fields, to provide video at 30 fps. In such a system, the time required to carry one frame across a given communication path or channel of the system is constant and is the reciprocal of the frame rate: $1/30$ sec.

There is often a need to switch video signal sources when engaged in operations such as commercial insertion, promo insertion, studio routing, camera switching, tape editing, and the like. In an NTSC system as described above, which does not employ compressed video data, it is relatively simple to switch the input of a given video sink from a first video signal source to a second video signal source. Typically, this is done by switching from one source to another and have the resulting image make a clean cut from one stream to the next. Such switching typically takes place in the vertical interval of the video signal. The associated audio signal is usually also switched simultaneously.

In some newer video facilities (e.g., TV, stations), digital video signals are used to represent video images. The digital video data consists of a compressed or encoded digital bitstream, various segments of which represent a given frame or field. Each frame segment or portion of the compressed video bitstream thus contains compressed data bits that represent the frame. The compressed video bitstream itself represents a sequence of frames (images). In the International Standards Organization (ISO) ISO/IEC 11172 Moving Pictures Experts Group-1 standard (MPEG-1), for example, the display rate and average transmission rate is 30 pictures/second. For the ISO/IEC 13818 (MPEG-2) standard, the display rate and average transmission rate can be 30 frames/second. The MPEG standards support other frame rates as well, including 29.97 and the PAL standard of Europe. In the MPEG standards, the term "picture" refers to a bitstream of data which can represent either a frame of data (i.e., both fields), or a single field of data. In the present application, the general term "frame" will be used for simplicity of explanation.

In such systems, there may be different picture or frame types in the compressed digital stream, such as I frames, P frames, and B frames. I frames, or intra-frames, are self-contained, that is, they are not based on information from previously transmitted and decoded frames. Video frames which are encoded with motion compensation techniques are referred to as predicted frames, or P frames, since their content is predicted from the content of previous I or P frames. P frames may also be utilized as a base for a subsequent P frame. I and P frames are both "anchor" frames, since they may be used as a basis for other frames, such as B or P frames which are predicted based on anchor frames. A "bidirectional" or B frame is predicted from the two anchor frames transmitted most recently relative to the transmission of the B frame. However, because the B frames are typically sent out of order (late), one of the two anchor frames used by a B frame is after the B frame in display order, although it must of course be received by the decoder before the B frame is reconstructed.

I frames typically are the largest in terms of number of encoded bits per frame, while B frames are the smallest, and P frames are somewhere in between. I frames may take many frame times to send (at standard bit rates), while P and B frames often take only a fraction of a frame time. I, P, and B frames are utilized in coding standards such as MPEG-1, while other standards, such as H.261 (P×64), developed by the International Telegraph Union (ITU), utilize only I and P frames.

An encoder at the source end receives unencoded video frame data and compresses the data to provide the compressed digital bitstream. A decoder at the receiving end receives and decompresses (decodes) the data, so that it is put into more useful form, for example for display on a monitor. Referring now to FIG. 1, there is shown a prior art compressed video data transmission system, which includes encoder 110, transmission channel 120, and decoder 130. Encoder 110 receives unencoded video frames from a video frame source and is itself a video data source since it provides a compressed video bitstream. Encoder 110 includes a video buffering verifier (VBV) 111. Decoder 130, a video sink, comprises buffer 131 and is coupled to a display device such as monitor 132. The capacity or bandwidth of channel 120 is sufficient to transmit 30 fps on average.

Such a system may be referred to as a constant bit rate (CBR) system. A group of pictures (GOP), which includes at least one I frame, and optionally, a number of B and P frames, is typically transmitted as part of a compressed bitstream by encoder 110 across channel 120 as illustrated in FIG. 2. As can be seen in video data transmission sequence 200 of FIG. 2, in a CBR system such as system 100, although the size of the bitstream for each consecutive frame may vary, the average size of the frames is equal to the maximum average frame size achievable via channel 120, so that the entire channel capacity is used to maximize picture quality and to avoid over- or underflowing buffer 131. Overflowing or underflowing buffer 131 is referred to as a "buffer exception." Overflow is usually worse than underflow, because underflow requires the decoder to wait for more data to arrive, which usually means a momentary freeze frame and thus some slight temporal distortion, while overflow causes data to be lost, which may result in the loss of all subsequent pictures in the GOP until the next I frame arrives.

Unlike systems in which the time required to transmit a frame from a given source to a given destination is constant (e.g. $\frac{1}{30}$s), in a compressed data system such as system 100 the time required to carry the frame or bitstream segment for each frame across channel 120 can vary from great to small from one frame to the next, because the size of the encoded bitstream can vary with the type of frame and also depending on the complexity of the scene information in that frame, how successful the motion compensation block matching was for a given predicted frame, and so on. Unencoded video frame data in is provided on input line 115 to encoder 110 at a constant time per frame (e.g., one frame each $\frac{1}{30}$ second), and decoded video frames are provided as video out on output line 135 to monitor 132 at the same constant frame rate. However, the time per frame for the compressed or encoded bitstream via channel 120 varies, with an average of 30 fps. This means that the frame boundaries in the compressed bitstream occur at irregular intervals, although these intervals occur 30 times per second on average. The bitrate or bandwidth of channel 120 is sufficient to support the output of encoder 110. Decoder 130 must display a new frame on monitor 132 every $\frac{1}{30}$ second, despite the fact that the frame data is arriving via channel 120 at varying intervals.

Referring once more to FIG. 2, video data transmission sequence 200 illustrates the order of transmission of an exemplary GOP used in video system 100. Sequence 210 shows the transmission timing of frames in a GOP of the compressed bitstream transmitted on channel 120. Sequence 220 shows the display timing of the received and decoded frames, which are displayed on monitor 132. Each frame is labeled I, B, or P according to its picture type, with a subscript indicating the display order. Frames in display sequence 220 are displayed at regular intervals, e.g. one frame for each $\frac{1}{30}$ second interval. The frame boundaries of transmission sequence 210 occur at irregular intervals.

Each P frame is predicted based on the most recent, previous anchor (I or P) frame. Each B frame is predicted based on the most recent two anchor frames transmitted. Thus, for example, frame $I_2$ is transmitted first, since it is used for predicting frames $B_0$, $B_1$, and $P_5$, but is displayed after decoded frames $B_0$, $B_1$. B frames are typically displayed immediately after receipt. Frames $B_0$, $B_1$ are each predicted based on previously-transmitted (but subsequently displayed) frame $I_2$, as well as the last P frame of the previous GOP. Thus, the GOP of sequence 200 is an "open" GOP. "Closed GOPs" may also be used, which are self-contained GOPs, in which none of the B frames needs an anchor frame from another GOP for prediction purposes.

There is a delay between the beginning of transmission of the bitstream portion corresponding to a given frame and the beginning of its display by decoder 130. Various delays are indicated by horizontal portion of lines $D_0$, $D_1$, etc. in FIG. 2. The various delays vary from frame to frame, because the frame boundaries of the compressed bitstream (transmission sequence 210) vary. Thus, for example, delay $D_3$ may be shorter than delay $D_4$, because transmitted frame $B_3$ is shorter in bit size or length than frame $B_4$, while the display interval for frames $B_3$ and $B_4$ does not vary. Delay $D_5$, the delay for P frame $P_5$, may be longer or shorter than the delay for other P frames.

Thus, decoder bitstream buffer 131 is employed, to reconcile the difference arising from the frame boundaries being unevenly spaced at the input to decoder 130 but evenly spaced at its output. Buffer 131 can therefore hold enough frames data so that at regular intervals decoder 130 has available to it all the data it needs to create the next image to display. Encoder 110 itself constructs its output bitstream carefully to avoid overflowing or underflowing this buffer. This is done by employing a model of a theoretical decoder's buffer, called the VBV. The VBV is a bitstream constraint, not a decoder specification. Encoder 110 encodes data so as not to over- or underflow the VBV buffer. Decoder designers depend on the fact that the bitstreams their decoders receive will be thus constrained, which allows them to design a practical decoder buffer such as decoder 130. If decoder 130 meets the constraints built into the compressed bitstream, then just as VBV 111 is not overflowed or underflowed, the actual buffer 131 of decoder 130 will not be overflowed or underflowed.

At any given time, the hypothetical buffer of VBV 111 has a certain VBV "occupancy" or fullness. Using this information, encoder 110 can vary the encoding parameters (such as degree of compression or quantization, for example) to increase or decrease the size of the encoded bitstream for the current or subsequent frames to ensure that the hypothetical VBV buffer will not overflow or underflow. Because decoder 130 is designed with the VBV constraints in mind, it also will not over- or underflow so long as the hypothetical buffer of VBV 111 does not. In this manner, the VBV fullness or occupancy will correspond to the past encoding history of the bitstream, which is also being received by actual buffer 131, which thus has its own fullness that corresponds, with some delay, to that. of the VBV.

As in uncompressed video systems, there is a need to switch compressed video bitstream sources applied to a given video data sink. Thus, the encoded or compressed bitstream coming from a first encoder or other video source should be stopped and switched to that coming from a second encoder or video source, and applied to the given decoder or video sink. This process is sometimes referred to, e.g. in the MPEG standards, as "splicing" the two video bitstreams. The point at which the first or old input bitstream is switched over to the new or second input bitstream may be referred to as a "splice point." Bitstream splicing is described in further detail in Norm Hurst & Katie Comog, "MPEG Splicing: A New Standard for Television," *SMPTE Journal*, Vol. 107, No. 11, November 1998, p. 978, the entirety of which is incorporated herein by reference.

However, it can be difficult to splice two compressed video bitstreams, such as MPEG bitstreams, for several reasons. First, P and B frames cannot be reconstructed by a decoder such as decoder 130 without it having received and decoded the preceding I or P frame. Thus, cutting "in" to a bitstream after an I frame renders the subsequent P and B frames meaningless. Additionally, the B frames are sent out of order, which makes splicing even more difficult. Cutting in at the wrong point can "cut off" some B frames, for example, from the anchor frame needed to reconstruct the B frame, and thus create "holes" in the frame sequence displayed on monitor 132.

Second, unlike uncompressed video, frame boundaries in the bitstream are not evenly spaced. Synchronizing frame boundaries to splice two streams is a problem that must be solved dynamically at the time of the splice. This can be very difficult or impossible in some cases. This problem can also lead to buffer overflow or underflow problems. Because frame boundaries are unevenly spaced at the input to a decoder, as described above with reference to FIG. 2, bitstream buffer 131 and VBV 111 are employed at the decoder and encoder ends, respectively. Although each compressed bitstream is carefully constructed to avoid overflowing or underflowing the VBV, switching to another stream could easily cause one of the buffer exceptions of overflow or underflow of buffer 131 to occur. The reason for this potential "buffer management" problem is that the status of decoder buffer 131 at any given time is a function of the entire history of the bitstream since decoder 130 began decoding that stream. The bitstream up until the splice point is generated by the first encoder 110 which keeps track of the bitstream status with VBV 111.

When decoder 130's input is switched from one video bitstream source (encoder 110) to another, the second bitstream is being generated by an encoder that does not have the same history as the bitstream from encoder 110. Thus the second encoder's own VBV will have a different fullness, for example, than that of VBV 111 of encoder 10. The subsequent encoding of the bitstream, after the splice point, will not be based on the bitstream history being received by decoder 130 up until that point. In effect, the bitstream constraints that normally govern the characteristics of the compressed bitstream, on which decoder 130 is relying, are violated when the second bitstream is simply substituted for the first.

If, for example, the second encoder's VBV indicates that the hypothetical decoder buffer is more full than it really is (i.e., if the second encoder's VBV buffer fullness is higher at the splice point than VBV 111 was at that point, due to their different bitstream histories), then at some later time the second encoder may allocate more bits to a frame than are really available in the hypothetical decoder buffer (and also actual decoder buffer 131), causing underflow of decoder buffer 131 and thus causing a momentary freeze frame. The reason for this is that if the decoder buffer is believed to be more full, then an encoder erroneously assumes it can transmit more bits per frame since these can be emptied from the decoder buffer without causing underflow.

Similarly, if the second decoder's VBV indicates decoder buffer 131 is emptier than it really is, then the second encoder may allocate fewer bits to a frame than it is able to. This can cause too many frames to be transmitted on average, which can cause decoder buffer 131 to overflow because decoder 130 does not draw down or empty the decoder buffer quickly enough since each frame is too small in size. Overflow can cause data to be lost, as described above, which can have catastrophic results. Underflow or overflow may thus cause some frames to be skipped, or may produce temporal distortion or other undesirable results, such as diminished picture quality. Thus, bitstream splicing can give rise to various artifacts and other undesirable effects.

One way to splice bitstreams to avoid these problems is to carefully control the two bitstreams and their video content so that at the time that a splice is desired, the two encoders have "synchronized" bitstreams (the same VBV occupancy). This approach is not always feasible or available, however. For example, there may be a need to switch to a second video source which is not already synchronized with the existing encoder and decoder.

SUMMARY

In a data transmission system, an encoder provides a bitstream having a sequence of frame segments, wherein each frame segment has a bit size which is limited by the encoder to a maximum bit size. A transmission channel is provided which has a channel rate sufficient to transmit a frame segment of maximum bit size within a frame interval. A burst transmitter receives the bitstream from the encoder and transmits each consecutive frame segment, at regular frame intervals, in a burst at the channel rate via the transmission channel, to provide a bursty bitstream over the transmission channel.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 3:
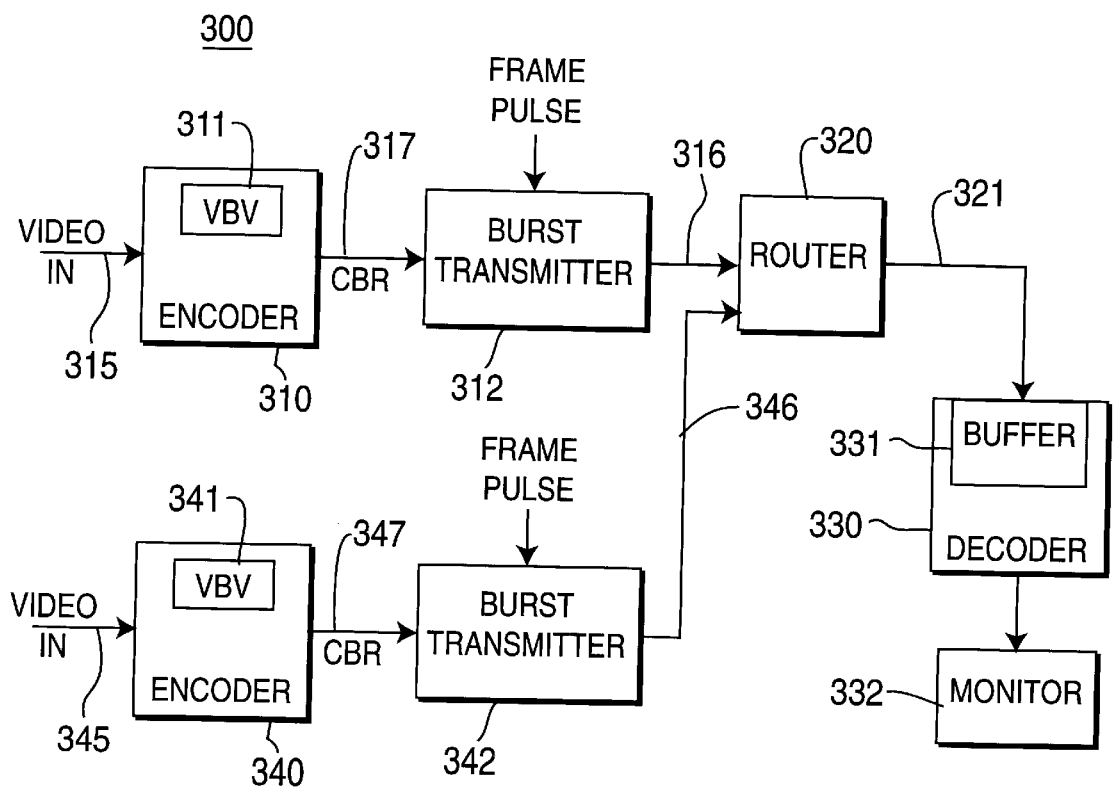
FIG. 3 is a block diagram of a compressed video data transmission system, in accordance with an embodiment of the present invention.

Referring now to FIG. 3, there is shown a block diagram of a compressed video data transmission system 300, in accordance with an embodiment of the present invention. System 300 comprises a communications network which provides a high-speed communications channels 316, 346 for each encoder's compressed bitstream. Router 320 is used to couple selected video sources to selected video sinks. System 300 includes sources such as video encoders 310, 340, and video sinks such as video decoder 330. Each encoder 310, 340 has a VBV 311, 341, and is coupled to a burst transmitter 312, 342. Decoder 330 comprises buffer 331, and is coupled at an input to the output of router 320 and at an output to monitor 332.

System 300 is, in one embodiment, an MPEG-compatible system having an average system frame rate of 30 fps. An average frame time or interval is therefore 1/30 second. Thus, any transmission channel used in the system must have a minimum bitrate or bandwidth sufficient to transmit 30 fps on average. At the minimum bitrate sufficient to transmit 30 average frames per second, for a given encoding scheme, an I frame may require several frame intervals to transmit, while P and B frames require only a fraction of a frame interval to transmit.

System 300, also employs a high-speed network having some transmission channels with a bandwidth much faster than the minimum bitrate required to transmit 30 fps on average. Given a communications network that can deliver a certain maximum number of bits in a frame interval, then if the size of every compressed I frame (and indeed every frame) in the bitstream is limited to this maximum size, then any frame is guaranteed to be deliverable across the network in a frame interval or less. Each encoder of system 300 implements this limit in encoding video frames, by ensuring that the bitsize of the compressed bitstream segment for every frame (the frame segment) is no greater than the maximum size. In other words, a compressed bitstream comprises a sequence of variable-size frame segments, each of which is limited to some maximum size, where the maximum size is the greatest number of bits deliverable by the network in a frame interval, where the frame interval is the reciprocal of the average frame rate.

For example, the channel rate (physical bitrate) of channels 316, 346 may be 622 Mb/s. The channel rate divided by the average frame rate thus provides the number of bits (the maximum frame bitsize) that can be transmitted over the channel during each regularly spaced frame interval. The size of each I frame (i.e., the size of the compressed bitstream segment representing the I frame data) is thus limited to [622 Mb/s]/[30f/s]=622 Mb/30 f=20.7 Mb/frame. That is, a 622 Mb/s channel can transmit up to 20.7 Mb each frame interval. Since 20.7 Mb/frame is about four times the number of bits used to encode typical I frames in systems such as the Grand Alliance Transmission System, setting the I frame bit size limit at 20.7 Mb with encoders 310, 340 is feasible.

Figure 4:
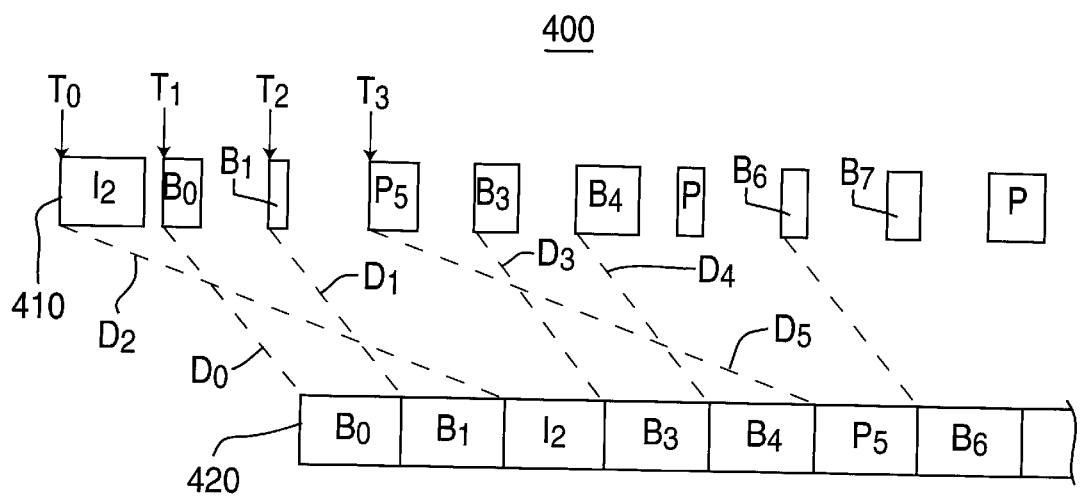
FIG. 4 is a data transmission chart showing the bursty data transmission sequence of the video system of FIG. 3.

Thus, the data encoding and transmission scheme of system 300 ensures that each frame is delivered to decoder 330 before the decoder needs to access it. Referring now to FIG. 4, there is shown a data transmission chart illustrating the bursty data transmission sequence 400 of the video system of FIG. 3. Unencoded video frame data in is provided on input line 315 to encoder 310 at a constant time per frame (e.g., one frame each 1/30 second), and a CBR compressed bitstream is provided to burst transmitter 312 via output line 317. As will be appreciated, the frame boundaries in the compressed bitstream on line 317 occur at irregular intervals, although these intervals occur 30 times per second on average. Similarly, a separate video in source is applied to input line 345 of encoder 340, which provides a second CBR compressed bitstream to burst transmitter 342 via output line 347. VBVs 311 and 341 are independent models and their fullnesses are each based on the history of their respective bitstreams.

Figure 1:
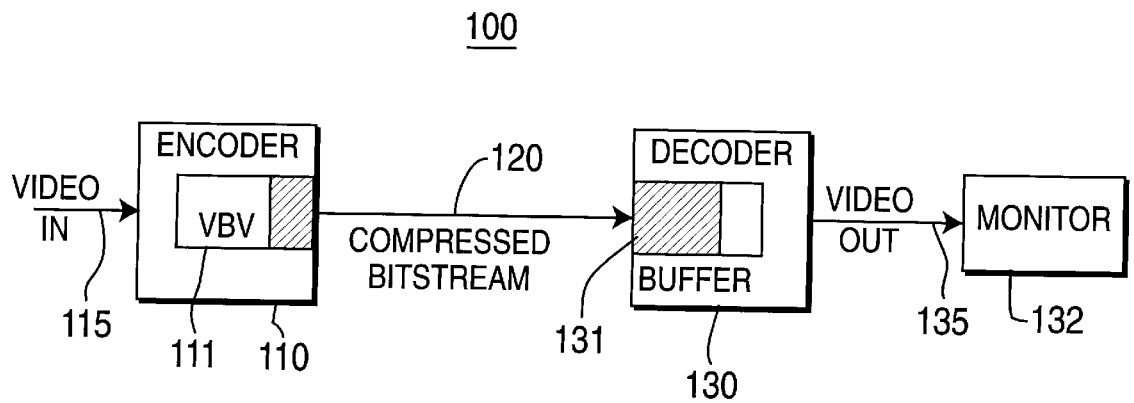
FIG. 1 is a block diagram of a prior art compressed video data transmission system.
Figure 2:
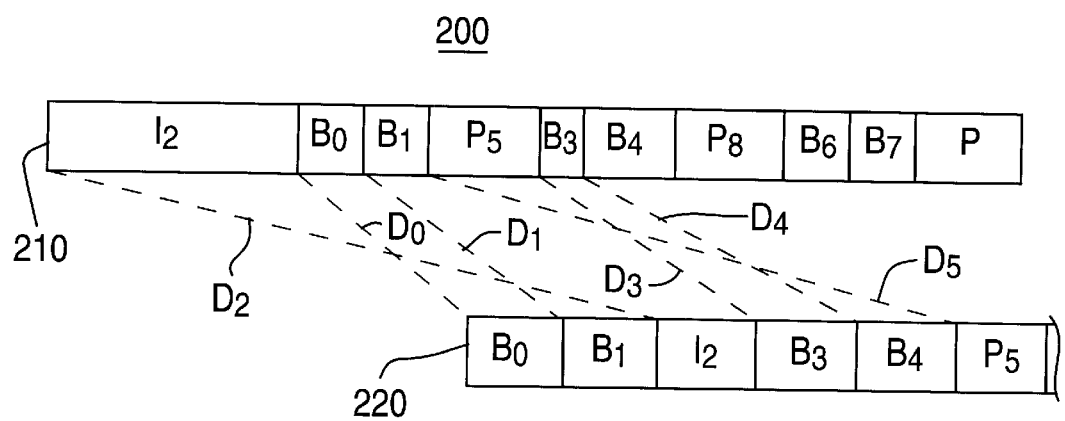
FIG. 2 is a data transmission chart showing the video data transmission sequence of the video system of FIG. 1.

Burst transmitter 312 buffers up the bits for each frame received from encoder. 312, and transmits them in [a] individual frame "bursts" (i.e., at the actual channel rate of 6.22 Mb/s) at the appropriate time in accordance with the frame pulse. The frame pulse is a synchronization reference signal provided as a master-system timing reference, and pulses each 1/30s. Burst transmitter 312 thus receives CBR data such as shown in FIG. 2, and "speeds up" the data when transmitting it at the higher transmission rate, in bursts, via channel 316. Burst transmitter 342 operates similarly with respect to the second video bitstream. Router 320 receives both bursty data streams and selectively routes one of them via its output line 321 to buffer 331 of decoder 330.

Thus, each encoder provides a compressed bitstream to a burst transmitter, which transmits each consecutive frame segment in a burst, where each such bursty transmission begins at the beginning of the next consecutive regular frame interval. The receiving end or sink of the transmission channel (e.g., decoder 330 and router 320, or simply decoder 330 where a router is not employed) therefore also receives each consecutive frame segment of the bursty bitstream within a frame interval of a series of consecutive, regularly-spaced frame intervals. The frame intervals into which the frame segments fall at the receiving end may be considered to begin when the first bits of the frame segment is received. Thus, each frame segment is received beginning at the beginning of a regular frame interval, and is received within the regular frame interval.

Referring once more to FIG. 4, video data transmission sequence 400 illustrates the order of bursty transmission of an exemplary GOP used in video system 400. Sequence 410 shows the transmission timing of frames in a GOP of the compressed bursty data transmitted on channel 316. Sequence 420 shows the display timing of the received and decoded frames, which are displayed on monitor 332. Each frame is labeled I, B, or P according to its picture type, with a subscript indicating the display order. Frames in display sequence 420 are displayed at regular intervals, e.g. one frame for each 1/30 second interval. Note that, unlike prior art transmission sequence 210, the beginning frame boundaries of transmission sequence 410 occur at regular intervals, even though the bit size of each compressed frame varies. This is because each frame is transmitted at a burst at the regular beginnings of each frame transmission interval, and are guaranteed to be received by the decoder at the end of the frame transmission interval because each frame is transmitted in a burst sufficiently fast to guarantee that all bits in the bitstream for the current frame are transmitted in a frame interval or less. Thus, the data transmitted via channels 316, 346 is transmitted in a bursty fashion sufficient to deliver each frame's worth of data in the bitstream in a frame interval or less.

There is a delay between the beginning of transmission of the bursty frame data corresponding to a given frame and the beginning of its display by decoder 330. Various delays are indicated by horizontal portion of lines $D_0$, $D_1$, etc. in FIG. 4. Unlike a CBR system, the various delays do not vary from frame to frame, because the bitstream portion or segment for each frame is transmitted in a bitstream burst at regular intervals $T_0$, $T_1$, $T_2$, $T_3$, . . . Thus, for example, B frame delays $D_0=D_1=D_3=D_4$. Delay $D_2$ is longer than the B frame delays only because of the different transmission order. However, all anchor frame delays are equal to all other anchor frame delays, and all B frame delays are equal to all other B frame delays.

No matter what GOP format or frame ordering is employed, therefore, the delays involved are fixed and predictable. This may be exploited by a suitably-designed decoder 330 and decoder buffer 331 to avoid the buffer management problem mentioned previously. Decoder 331 knows that it will receive a new burst of complete frame data at regular intervals. Therefore, decoder 331 removes the latest frame's worth of data bits from buffer 331 each frame interval and decodes and displays this frame. This allows decoder 331 to receive a spliced bitstream without underflowing or overflowing buffer 331.

Thus, in the present invention, high-speed burst transmission is used to transmit the compressed bitstream for each of several video sources to various video sinks. In particular, each encoder is coupled to a burst transmitter which uses high-speed transmission channels to transmit the bitstream segment for each subsequent frame, at regular frame intervals to a given video sink or destination, such as router 320 and decoder 330. Each encoder limits the size of each frames bitstream segment (bit size)to the high-speed channel bitrate divided by the frame rate.

Thus, the present invention avoids the buffer management problem of CBR systems, but system 300 must still address the splicing problem that arises when GOPs use predicted and out-of-order frames. One solution is to use a closed GOP frame structure and to permit splicing only at I frames. Although this limits splicing to GOP boundaries, the bursty data transmission of the present invention solves the buffer management problem that plagues even CBR systems that also used closed GOPs. Another solution is to employ GOPs having only I frames, which permits a splice to be made any time.

In an alternative embodiment, rather than using the bursty data transmission of the present invention to obviate the buffer management problem, at the receiving end of a bursty data transmission, a burst receiver is used to "un-wind" or slow down the received bursty data, to provide a standard CBR bitstream. For example, a burst receiver may be incorporated into decoder 330 or placed between router 320 and decoder 330. Buffer 331 thus receives a standard CBR compressed bitstream identical to that applied to burst transmitter 312, for example, via line 317. This allows a high-bandwidth transmission channel such as channel 316 or 346 to be used to transmit frame data in bursts, while making the existence of the high-bandwidth channel transparent to both encoders and decoders, due to the presence of the burst transmitter and burst receiver units.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system, comprising:
   (a) a video encoder for providing a compressed video bitstream having sequence of frame segments, wherein each frame segment (1) corresponds to a different frame in the bitstream and (2) has a bit size which is limited by the encoder to a maximum bit size;
   (b) a transmission channel having a channel rate sufficient to transmit a frame segment of the maximum bit size within a frame interval, wherein the frame-interval is the reciprocal of an average frame rate of the bitstream; and
   (c) a burst transmitter that receives the bitstream from the encoder and transmits each consecutive frame segment, at regular frame intervals, in a burst at the channel rate via the transmission channel, to provide a bursty bitstream over the transmission channel.

2. The system of claim 1, further comprising a decoder for receiving each consecutive frame segment of the bursty bitstream beginning at regular frame intervals via the transmission channel.

3. The system of claim 2, further comprising a router for receiving the first bursty bitstream and a second bursty bitstream transmitted from a second burst transmitter over a second transmission channel, wherein the router selectably transmits one of the first and second bursty bitstreams to the decoder.

4. The system of claim 2, wherein the decoder comprises a buffer for buffering each consecutive frame segment which is received within a regular frame interval.

5. The system of claim 2, further comprising a router for receiving the first bursty bitstream and a second bursty bitstream transmitted from a second burst transmitter over a second transmission channel and for providing a selected one of the first and second bursty bitstreams at an output to the decoder, wherein:

the decoder comprises a buffer for buffering each consecutive frame segment which is received within a regular frame interval;

the router provides a spliced bursty bitstream to the decoder by switching the router output from the first bursty bitstream to the second bursty bitstream at a boundary between frame intervals; and the decoder removes and processes each consecutive frame segment from the buffer at regular frame intervals without incurring a buffer management problem.

6. The system of claim 1, further comprising a burst receiver for converting the bursty bitstream to a bitstream at a lower bitrate equal to an encoder bitrate at which the encoder produced the bitstream.

7. The system of claim 1, wherein the burst transmitter buffers each frame segment received before transmitting said each frame segment.

8. The system of claim 1, wherein the bit sizes of the frame segments of the bitstream vary.

9. The system of claim 1, wherein the frame interval is a reciprocal of an average frame rate at which the frame segments of the bitstream are produced by the encoder.

10. The system of claim 9, wherein the encoder receives consecutive unencoded frames of data at the average frame rate and compresses each consecutive unencoded frame of data into corresponding consecutive compressed frame segments of the bitstream.

11. The system of claim 10, wherein the encoder comprises a video buffering verifier used during encoding of the unencoded frames of data into the bitstream to avoid underflowing or overflowing a hypothetical model decoder buffer.

12. The system of claim 1, wherein the bitstream is provided by the encoder at a constant bit rate.

13. An apparatus for a compressed video data transmission system, the apparatus comprising a burst transmitter configured to:
   (a) receive a constant bit rate (CBR) compressed video bitstream generated by a video encoder and having a sequence of frame segments, wherein each frame segment (1) corresponds to a different frame in the bitstream and (2) has a bit size which is limited by the encoder to a maximum bit size; and
   (b) transmit each consecutive frame segment, at regular frame intervals, over a transmission channel in a burst via the transmission channel, to provide a bursty bitstream over the transmission channel, wherein the transmission channel has a channel rate sufficient to transmit a frame segment of the maximum bit size within a frame interval, wherein the frame interval is the reciprocal of an average frame rate of the bitstream.

14. The apparatus of claim 13, further comprising the encoder configured to generate and transmit the bitstream CBR compressed video bitstream to the transmitter.

15. The apparatus of claim 13, further comprising a router configured to:
   (a) receive the bursty bitstream from the transmitter and at least one other bursty bitstream from at least on other transmitter; and
   (b) select one of the bursty bitstreams for further transmission to a decoder wherein the selection of the one bursty bitstream for further transmission can be changed from a first bursty video bitstream to a second video bitstream without incurring a buffer management problem at the decoder.

16. The router of claim 15, wherein:

each bursty video bitstream has a closed GOP (group of pictures) structure; and changing the selection from the first bursty video bitstream to the second bursty video bitstream is limited to I frames in the closed GOP structures.

17. A router for a compressed video data transmission system, wherein the router is configured to:

(a) receive a plurality of bursty video bitstreams via one or more transmission channels from a plurality of burst transmitters, wherein:

- each bursty video bitstream composes a plurality of bursts transmitted, at regular frame intervals, by a corresponding burst transmitter via the one or more transmission channels at a channel rate sufficient sufficient to transmit a frame segment of a maximum bit size within a frame interval;
- the frame interval is the reciprocal of an average frame rate of the bitstream;
- each burst corresponds to a different frame segment of the corresponding bitstream; and
- each frame segment corresponds to a different frame in the bitstream; and (b) select one of the bursty video bitstreams for further transmission to a decoder, wherein the selection of the one bursty video bitstream for further transmission can be changed from a first bursty video bitstream to a second video bitstream without incurring a buffer management problem at the decoder.

18. The router of claim 17, wherein:

each bursty video bitstream has a closed GOP (group of pictures) structure; and changing the selection from the first bursty video bitstream to the second bursty video bitstream is limited to I frames in the closed GOP structures.

* * * * *